United States Patent
Liu et al.

(10) Patent No.: US 8,747,159 B2
(45) Date of Patent: Jun. 10, 2014

(54) CONNECTOR MODULE

(75) Inventors: Yang Liu, Shenzhen (CN); Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 54 days.

(21) Appl. No.: 13/531,063

(22) Filed: Jun. 22, 2012

(65) Prior Publication Data
US 2013/0115786 A1 May 9, 2013

(30) Foreign Application Priority Data
Nov. 8, 2011 (CN) .......................... 2011 1 0350093

(51) Int. Cl.
*H01R 13/648* (2006.01)

(52) U.S. Cl.
USPC .................................. 439/607.2; 439/607.21

(58) Field of Classification Search
USPC ........................................ 439/607.2, 607.21
See application file for complete search history.

(56) References Cited

U.S. PATENT DOCUMENTS

| | | | |
|---|---|---|---|
| 6,524,134 B2* | 2/2003 | Flickinger et al. | 439/607.2 |
| 6,612,868 B2* | 9/2003 | Hwang | 439/607.54 |
| 8,183,470 B2* | 5/2012 | Zhang et al. | 174/359 |
| 8,426,751 B2* | 4/2013 | Lee et al. | 174/520 |
| 2004/0203289 A1* | 10/2004 | Ice et al. | 439/607 |
| 2006/0003632 A1* | 1/2006 | Long | 439/608 |
| 2006/0252311 A1* | 11/2006 | Togami et al. | 439/607 |
| 2009/0176409 A1* | 7/2009 | Oki | 439/607.2 |

* cited by examiner

*Primary Examiner* — Gary Paumen
(74) *Attorney, Agent, or Firm* — Novak Druce Connolly Bove + Quigg LLP

(57) ABSTRACT

A connector module includes a single port connector and a circuit board capable of assembling with a multi-ports connector. The single port connector includes a receiving room and a number of first fixing pins formed at opposite sides of the receiving room along a longitudinal direction of the receiving room. The first fixing pins at each side of the receiving are arranged in a same way. The multi-ports connector includes at least two of the receiving room and the first fixing pins formed at opposite sides of each receiving room. The circuit board defines a group of first fixing holes corresponding to the first fixing pins formed at each side of the receiving rooms of the multi-ports connector. The single port connector is mounted on the circuit board by selectively inserting the first fixing pins into every two adjacent groups of the first fixing holes.

16 Claims, 6 Drawing Sheets

CONNECTOR MODULE

TECHNICAL FIELD

The disclosure generally relates to connectors, and particularly, to a connector module that is suitable for different types of connector.

DESCRIPTION OF RELATED ART

In general, small form-factor pluggable connector (SFP connector) can be distinguished into a single port type and a dual port type. Pins of the single port type SFP connector is arranged differently from pins of the dual port type SFP connector. Furthermore, pin contacts of a circuit board designed for connecting with the dual port type SFP connector are unsuitable for a single port type SFP connector. Therefore, after the circuit board is made, the type of the SFP connector suitable for the circuit board is unchangeable, which is very inconvenient.

Therefore, it is desirable to provide a connector module which can overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
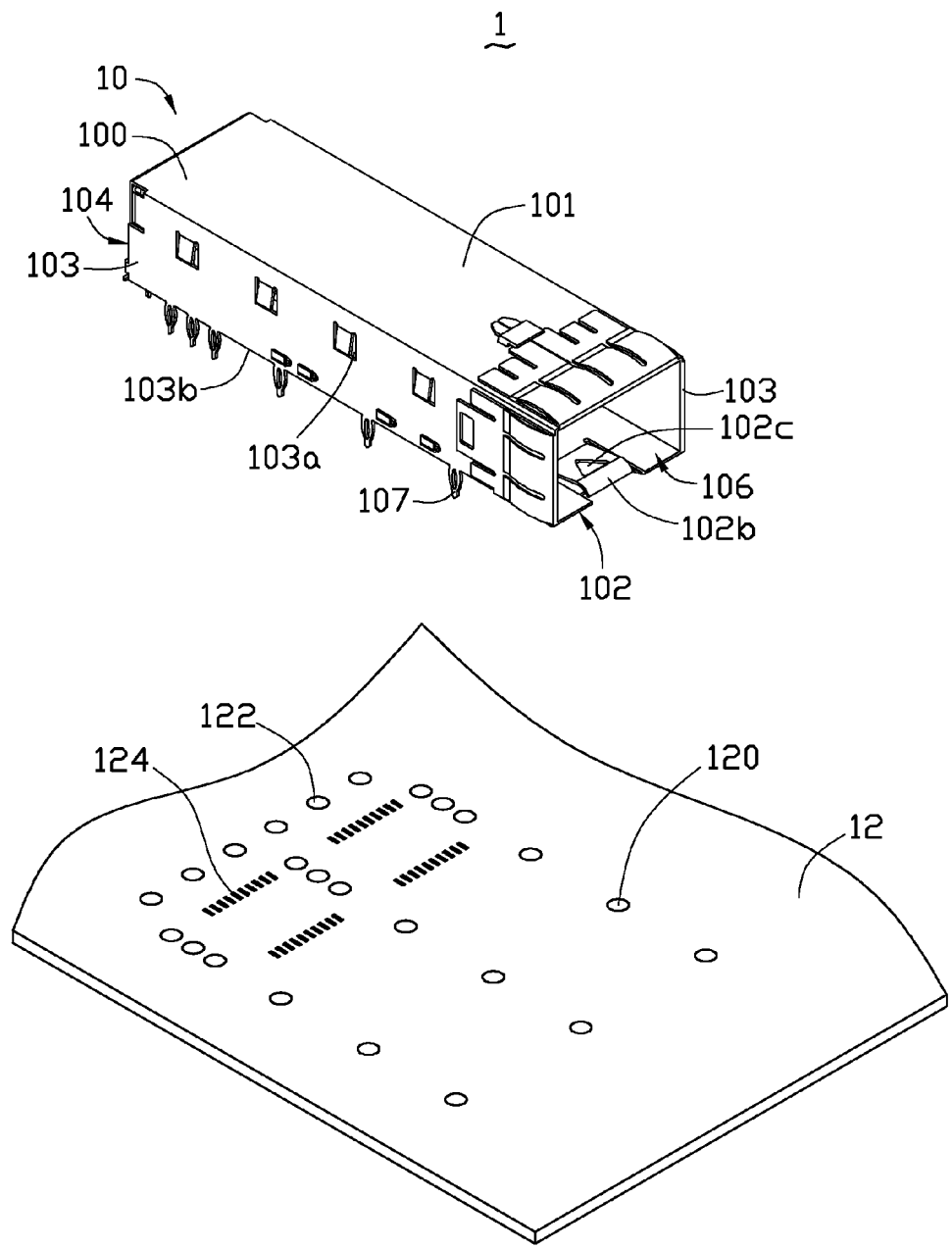
FIG. 1 is an exploded, isometric view of a connector module using a single port type connector in accordance with an exemplary embodiment of present disclosure.
Figure 2:
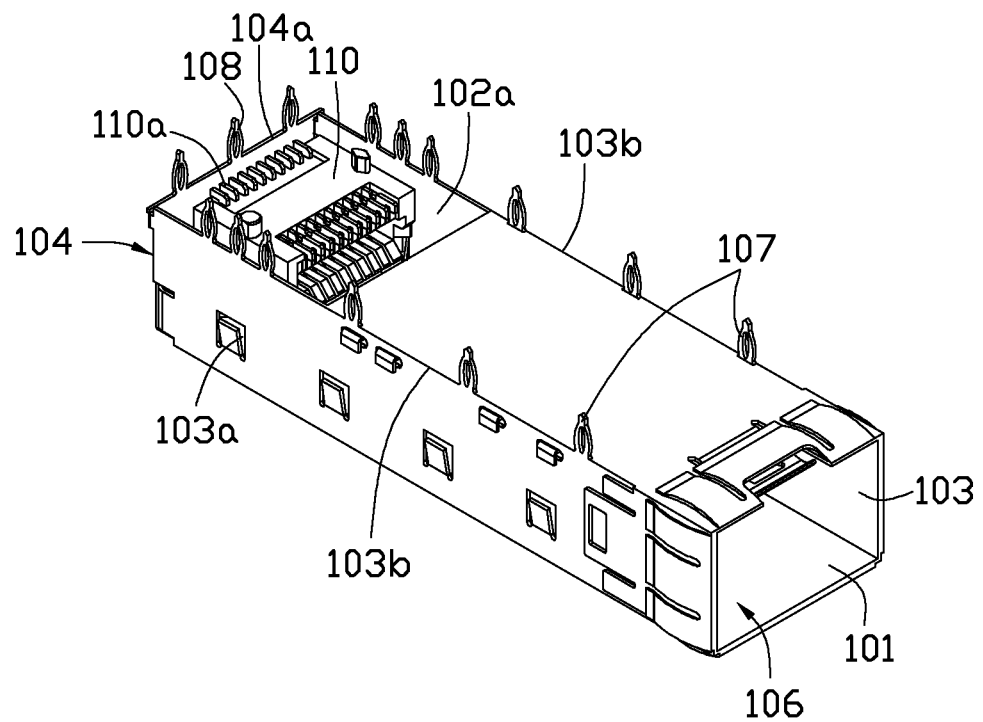
FIG. 2 is an isometric view of the single port type connector of FIG. 1, viewed from another angle.
Figure 3:
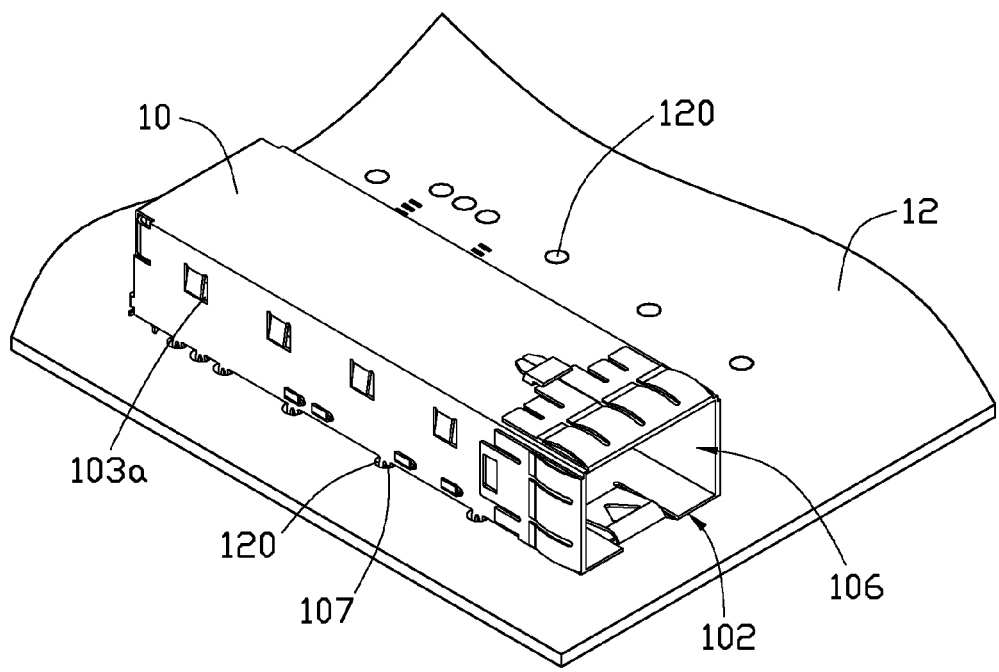
FIG. 3 is an assembled, isometric view of the connector module of FIG. 1

Referring to FIGS. 1 to 3, a connector module 1 includes a connector 10 and a circuit board 12 on which the connector 10 is mounted. The connector 10 includes an enclosure 100 and at least one signal transmission block 110 set in the enclosure 100. The signal transmission block 110 is configured for connecting with a signal transmission wire (not shown) to transfer an electrical signal from the signal transmission wire to the circuit board 12. The enclosure 100 accommodates the signal transmission block 110 and positions the signal wire connecting with the signal transmission block 110. The connector 10 is mounted on the circuit board 12 via the enclosure 100. In this embodiment, the connector 10 is small form-factor pluggable connector (SFP connector).

The enclosure 100 is a hollow elongated rectangular frame and includes a top wall 101, a bottom wall 102 parallel to the top wall 101, a pair of parallel side walls 103 perpendicularly connected to the top wall 101 and the bottom wall 102, an end wall 104 perpendiculary connected to an end of the top wall 101, the bottom wall 102, and the side walls 103, a number of first fixing pins 107, and a number of second fixing pins 108. The top wall 101, the bottom wall 102, the side walls 103 are encircling connected and cooperatively define a receiving room 106. The receiving rooms 106 accommodates the signal transmission block 110 set near the end wall 104.

Each signal transmission block 110 includes a number of signal pins 110a. The enclosure 100 defines an opening 102a in the bottom wall 102. The opening 102a is defined adjacent to the end wall 104 to expose the signal pins 110a of the signal transmission block 110. The enclosure 100 further defines a number of breather holes 103a in the side walls 103 for heat dissipation. The enclosure 100 forms a resilient bump 102b at a periphery of the bottom wall 102 opposite to the end wall 104. The enclosure 100 defines a positioning through hole 102c in each resilient bump 102b. The positioning through hole 102c is configured for engaging with a projection on the signal wire to fix the signal wire.

The first fixing pins 107 are located in an array, which includes two columns respectively extending from two bottom peripheries 103b of the pair of the side walls 103. Each column of the first fixing pins 107 are arranged in the same way along the longitudinal direction of the enclosure 100. That is to say, each first fixing pin 107 of each column aligns with the corresponding first fixing pins 107 of the other columns. The second fixing pins 108 extend from a periphery 104a of end wall 104 away from the top wall 101. The second fixing pins 108 are evenly spaced.

The connector 10 is mounted on the circuit board 12 near a periphery of the circuit board 12. The circuit board 12 respectively defines at least three columns of fixing holes 120 corresponding to the first fixing pins 107 and at least two groups of second fixing holes 122 corresponding to the second fixing pins 122. Each column of the first fixing holes 120 are arranged in the same way as each column of the first fixing pins 107. Different columns of the first fixing holes 120 are parallel to each other and evenly spaced. The distance between two adjacent columns of the first fixing holes 120 is the same as the distance between two columns of the first fixing pins 107. Each group of the second fixing holes 122 are arranged in the same way as the second fixing pins 108. Each column of the first fixing holes 120 includes two opposite sides along a longitudinal direction thereof. Each group of the second fixing holes 122 are formed at one side of the array of first fixing holes 120 away from the periphery of the circuit board 12 and between two adjacent columns of the first fixing holes 120.

The circuit board 12 forms a number of signal contacts 124 corresponding to the signal pins 110a of each signal transmission block 110 on a surface of the circuit board 12 on which the connector 10 is mounted. The signal contacts 124 corresponding to a signal transmission block 110 are respectively formed between every two adjacent columns of the first fixing holes 120. In this embodiment, each signal transmission block 110 includes two parallel rows of the signal pins 110a. Correspondingly, the signal contacts 124 on the circuit board 12 are arranged in two parallel rows.

When the connector 10 is mounted on the circuit board 12, the first fixing pins 107 are selectively inserted into every two adjacent columns of the first fixing holes 120, and the second fixing pins 108 are inserted into the second fixing holes 122 to fasten the connector 10 onto the circuit board 12. The signal pins 110a contact with the signal contacts 124 for transferring the electrical signal to the circuit board 12.

Figure 4:
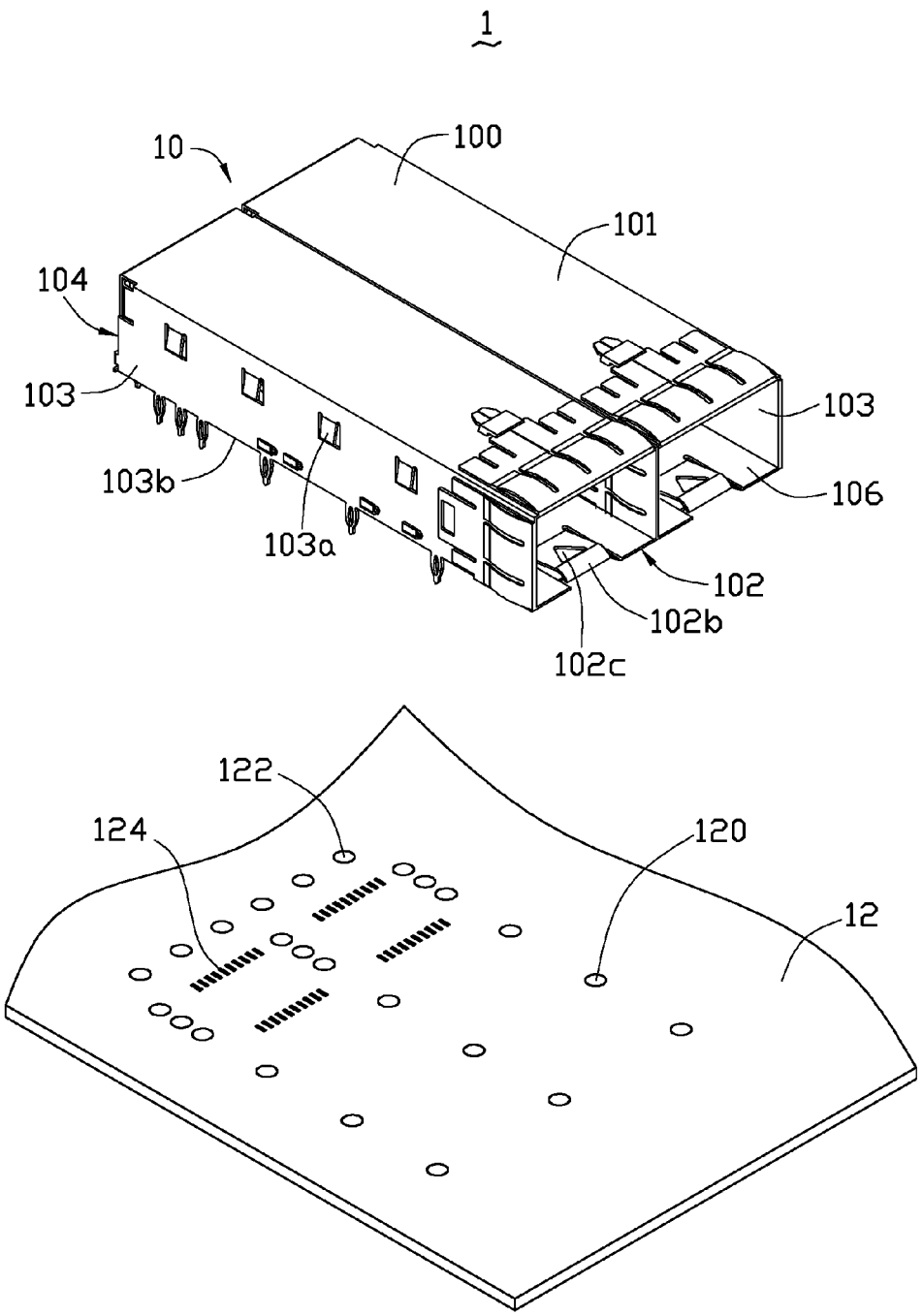
FIG. 4 is an exploded, isometric view of a connector module using a multi-ports type connector in accordance with an exemplary embodiment of present disclosure.
Figure 5:
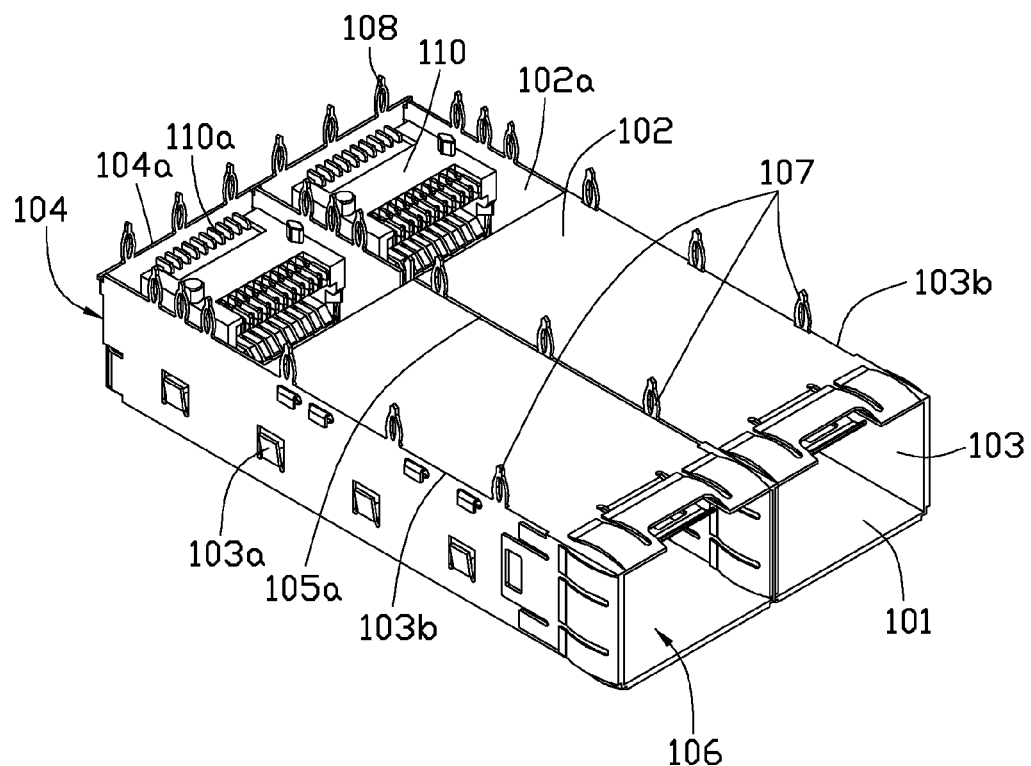
FIG. 5 is an isometric view of the multi-ports type connector of FIG. 4, viewed from another angle.
Figure 6:
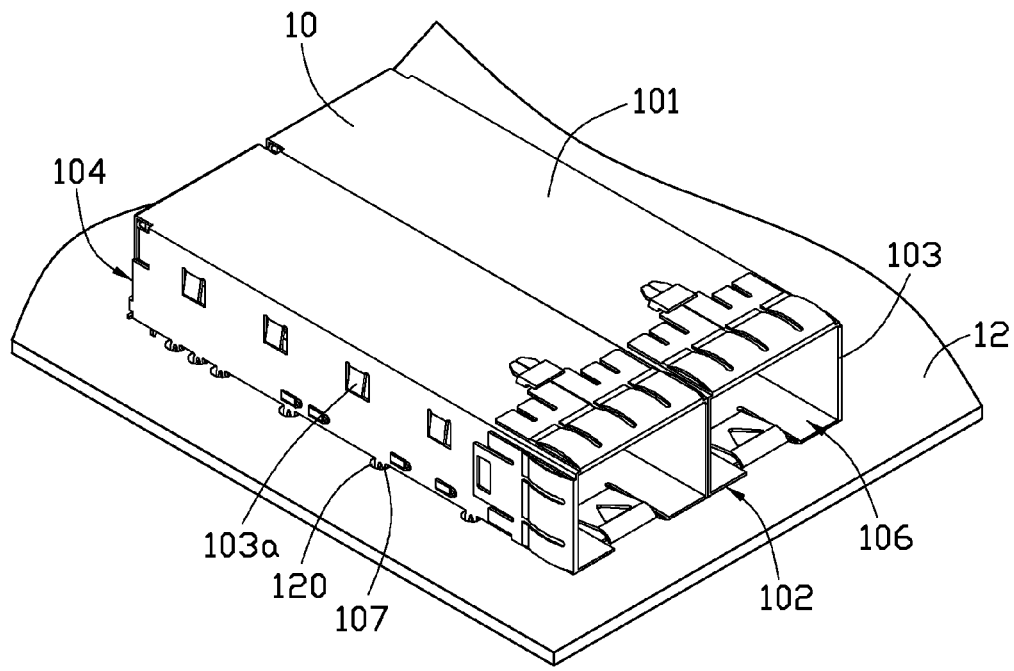
FIG. 6 is an assembled, isometric view of the connector module of FIG. 4

Referring to FIGS. 4 to 6, it is understood that the connector 10 also can be made as a multi-ports type. The multi-ports type connector 11 is made by connecting more than two single port type connectors 10 one by one along a direction perpendicular to the side walls 103. The adjacent side walls 103 of the different single port type connectors 10 are connected tighter and share a same column of first fixing pins 107.

Because the arrangement of each column of the first fixing pins 107 of the multi-ports type connector 11 is the same as the arrangement of of each column of the first fixing pins 107 of the single port type connector 10, and the arrangement of each group of the second fixing pins 108 of the multi-ports type connector 11 is the same as the arrangement of the second fixing pins 108 of the single port type connector 10, the first fixing pins 107 and the second fixing pins 108 of the multi-ports type connector 11 also can be inserted into the corresponding columns of first fixing holes 120 and the second fixing holes 122 to fasten the multi-ports type connector 11 onto the circuit board 12. Therefore, the multi-ports type connector 11 and the single port type connector 10 can be mounted on the same circuit board 12.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A connector module, comprising:
   a single port connector comprising a receiving room, a signal transmission block accommodated in the receiving room, a resilient bump formed at a periphery of the receiving room, and a plurality of first fixing pins formed at opposite sides of the receiving room and aligned along a longitudinal direction of the receiving room, the first fixing pins at the opposite sides being symmetrical with each other; and
   a circuit board defining more than three parallel columns of first fixing holes;
   wherein each column of the first fixing holes are arranged in the same way as the fixing pins formed at the same side of the receiving room, the single port connector is mounted on the circuit board by selectively inserting the first fixing pins into each two adjacent columns of the first fixing holes, and the single port connector defines a positioning through hole in the resilient bump.

2. The connector module of claim 1, wherein the single port connector comprises an enclosure, the enclosure comprises a top wall, a bottom wall parallel to the top wall, a pair of side walls perpendicularly connected to the top wall and the bottom wall, an end wall perpendicularly connected to an end of the top wall, the bottom wall, and the side walls, the receiving room is defined by encircling connection of the top wall, the bottom wall, and the side walls.

3. The connector module of claim 2, wherein the first fixing pins of the single port connector comprises two columns respectively extending from two bottom peripheries of the pair of the side walls.

4. The connector module of claim 2, the single port connector further comprises a plurality of second fixing pins extending from the periphery of the end wall opposite to the top wall, the circuit board defines more than two groups of second fixing holes corresponding to the second fixing pins, each group of the second fixing holes are arranged in the same way as the second fixing pins.

5. The connector module of claim 2, wherein further comprises a multi-ports connector, the multi-ports connector comprises more than one single port connectors connecting one by one along a direction perpendicular to the side walls, the adjacent side walls of the different single port type connectors are connected tighter and share a same column of first fixing pins.

6. The connector module of claim 1, wherein each signal transmission block comprises a plurality of signal pins, the circuit board forms at least two groups of signal contacts corresponding to the signal pins, each group of the signal contacts are formed between two adjacent columns of the first fixing holes, when the enclosure is mounted on the circuit board, the signal pins contact with the signal contacts for transferring an electrical signal to the circuit board.

7. The connector module of claim 2, wherein the signal transmission block is set near the end wall, the enclosure defines an openings on the bottom wall corresponding to the signal transmission block to expose the signal pins.

8. The connector module of claim 2, wherein the enclosure defines a plurality of breather holes in the side walls for heat dissipation.

9. The connector module of claim 2, wherein the enclosure forms at least two resilient bumps corresponding to each of the receiving rooms, the resilient bumps are formed at a periphery of the bottom wall opposite to the end wall.

10. The connector module of claim 1, wherein the first fixing pins of the single port connector comprises two columns respectively extending from two bottom peripheries of the pair of the side walls.

11. The connector module of claim 1, the single port connector further comprises a plurality of second fixing pins extending from the periphery of the end wall opposite to the top wall, the circuit board defines more than two groups of second fixing holes corresponding to the second fixing pins, each group of the second fixing holes are arranged in the same way as the second fixing pins.

12. The connector module of claim 1, wherein each signal transmission block comprises a plurality of signal pins, the circuit board forms at least two groups of signal contacts corresponding to the signal pins, each group of the signal contacts are formed between two adjacent columns of the first fixing holes, when the enclosure is mounted on the circuit board, the signal pins contact with the signal contacts for transferring an electrical signal to the circuit board.

13. The connector module of claim 1, wherein the signal transmission block is set near the end wall, the enclosure defines an openings on the bottom wall corresponding to the signal transmission block to expose the signal pins.

14. The connector module of claim 1, wherein the enclosure defines a plurality of breather holes in the side walls for heat dissipation.

15. The connector module of claim 1, wherein the enclosure forms at least two resilient bumps corresponding to each of the receiving rooms, the resilient bumps are formed at a periphery of the bottom wall opposite to the end wall.

16. A connector module, comprising:
   a single port connector comprising a receiving room, a signal transmission block accommodated in the receiving room, and a plurality of first fixing pins formed at opposite sides of the receiving room and aligned along a longitudinal direction of the receiving room, the first fixing pins at the opposite sides being symmetrical with each other; and a circuit board defining more than three parallel columns of first fixing holes; wherein each column of the first fixing holes are arranged in the same way as the fixing pins formed at the same side of the receiving room, the single port connector is mounted on the circuit board by selectively inserting the first fixing pins into each two adjacent columns of the first fixing holes, the single port connector comprises an enclosure, the enclosure comprises a top wall, a bottom wall parallel to the top wall, a pair of side walls perpendicularly connected to the top wall and the bottom wall, an end wall perpendicularly connected to an end of the top wall, the bottom wall, and the side walls, the receiving room is defined by encircling connection of the top wall, the bottom wall, and the side walls, the connector module further comprises a multi-ports connector, the multi-ports connector comprises more than one single port connectors connecting one by one along a direction perpendicular to the side walls, and the adjacent side walls of the different single port type connectors are connected tighter and share a same column of first fixing pins.

* * * * *